(12) United States Patent
Hiraiwa

(10) Patent No.: US 9,719,565 B2
(45) Date of Patent: Aug. 1, 2017

(54) SHIFT DEVICE WITH SYNCHRONIZER

(71) Applicant: KYOWA METAL WORKS CO., LTD., Kanagawa-ken (JP)

(72) Inventor: Kazuyoshi Hiraiwa, Kanagawa-ken (JP)

(73) Assignee: KYOWA METAL WORKS CO., LTD., Kanagawa-Ken (JP)

(*) Notice: Subject to any disclaimer, the term of this patent is extended or adjusted under 35 U.S.C. 154(b) by 108 days.

(21) Appl. No.: 14/691,884

(22) Filed: Apr. 21, 2015

(65) Prior Publication Data
US 2016/0312838 A1  Oct. 27, 2016

(51) Int. Cl.
*F16D 23/06* (2006.01)
*F16D 23/02* (2006.01)
*F16H 55/17* (2006.01)

(52) U.S. Cl.
CPC .......... *F16D 23/06* (2013.01); *F16D 23/025* (2013.01); *F16D 2023/065* (2013.01); *F16D 2023/0631* (2013.01); *F16D 2023/0637* (2013.01); *F16H 2055/178* (2013.01); *Y10T 74/19284* (2015.01)

(58) Field of Classification Search
CPC .... F16D 23/06; F16D 23/025; F16D 23/0612; F16D 2023/0631; F16D 2023/0637; F16D 2023/065; Y10T 74/19284; F16H 2055/178
See application file for complete search history.

(56) References Cited

U.S. PATENT DOCUMENTS

| | | | | |
|---|---|---|---|---|
| 5,695,033 A * | 12/1997 | Hiraiwa | ................ | F16D 23/06 192/53.32 |
| 8,020,682 B2 * | 9/2011 | Saito | ................ | F16D 23/06 192/53.362 |
| 2013/0205929 A1* | 8/2013 | Hiraiwa | ................ | F16H 3/083 74/339 |
| 2014/0109706 A1* | 4/2014 | Hiraiwa | ................ | F16D 23/06 74/339 |

FOREIGN PATENT DOCUMENTS

JP  11-257372 A  *  9/1999
JP  3699775      9/2005

* cited by examiner

*Primary Examiner* — Richard Lorence
(74) *Attorney, Agent, or Firm* — Wenderoth, Lind & Ponack, L.L.P.

(57) ABSTRACT

A shift device includes an output shaft, a hub, a speed gear, a sleeve, a synchronizer ring, lever members, and a spring. The lever members have torque receiving portions contactable with projections of the synchronizer ring to receive friction torque from the projections. Contact positions of the torque receiving portions and the projections in a synchronization operation are set at a hub side of the lever members and an axial-directional distance between points of support and the contact positions is less than a thickness of the lever member.

20 Claims, 12 Drawing Sheets

PRIOR ART

PRIOR ART

SHIFT DEVICE WITH SYNCHRONIZER

BACKGROUND OF THE INVENTION

1. Field of the Invention

The present invention relates to a shift device with a synchronizer for a transmission of a motor vehicle and the like in which press force applied to a sleeve can be transmitted to a synchronizer ring under a leverage operation using lever members while gears of the transmission are shifted.

2. Description of the Related Art

Such a conventional shift device is disclosed in Japanese Patent No. 3,699,775. This conventional shift device is equipped with a plurality of lever members located among a hub, a sleeve, and a synchronizer ring, where the synchronizer ring is capable of being pressed toward the speed gear due to a leverage operation using the lever members. In addition, the lever members decrease gear noise in a reverse-shift operation in a 5-speed forward transmission.

In any case of synchronization operations toward 5-speed and the reverse-speed, the lever members are pressed and moved toward outwardly in a radial direction due to friction torque generated between friction surface of the synchronizer ring and cone surface of the speed gear to be meshed so as to prevent the sleeve from advancing toward the speed gear until the end of the synchronization operation.

When the synchronization operation ends, force, which is generated due to the friction torque between the synchronizer ring and the speed gear to prevent advance of the sleeve, becomes zero because the friction torque vanishes. Then, the sleeve becomes to be capable of moving toward the speed gear, so that the sleeve advances, pressing the lever members toward inwardly in the radial direction through slanted surfaces formed on inner splines of the lever members. Then the sleeve engages with the speed gear through splines of the sleeve and the speed gear. This is the end of the shift operation.

However, in the above known conventional shift device, there is a problem in that an actual lever ratio of the leverage operation using the lever members cannot be sufficiently obtained because of press force acting on the lever members from the synchronizer ring due to the friction moment generated during the synchronization operation. Therefore, the synchronization performance cannot be sufficiently improved.

The reason will be explained below with reference to drawings of FIGS. 21 and 22 showing cross sectional views of main parts of conventional shift devices. In these figures, configurations of lever members are partially different from those of the above-mentioned prior art, but the operations and effects thereof are essentially the same.

FIG. 21 shows an upper half of a conventional shift device with a synchronizer using a plurality of lever members (In this case, two lever members). The sleeve 20 acts a not-shown force F1 on top portions 24c of the lever members 24 toward a right side in an axial direction in FIG. 20 at contact points W of the sleeve 20 and the lever members 24. The contact points W function as the points of effort in leverage operation using the lever members 24 during the synchronization operation.

The lever members 24 amplify the force F1 into not-shown force F2 due to the leverage operation, and the force F2 acts on the synchronizer ring 22 toward a right side in FIG. 20 at the contact points Y of the lever members 24 and the synchronizer ring 22. The contact points Y function as the points of action. The synchronizer ring 22 is pressed on a friction surface of a not-shown speed gear to perform the synchronization operation. In the leverage operation, contact points X of the lever members 24 and the hub 12 function as the points of support.

In the synchronization operation, projections 22c of the synchronizer ring 22 act not-shown force F3 on the lever members 24 toward outwardly in the radial direction at contact points Z of the projections 22c and the lever members 24. The force F3 is obtained due to the friction torque generated between the friction surface of the synchronizer ring 22 and the cone surface of the speed gear.

Accordingly, a relationship among the forces F1, F2 and F3 becomes below.

The lever ratio of the lever members 24 becomes L2/L1, where L1 is a distance between the point X of the support and the point Y of action, and L2 is a distance between the point X of support and the point W of effort. The lever ratio is, however, actually decreased because of the moment due to the force F3 acting in a direction opposite to a moment obtained due to the force F1 in the leverage operation, because the lever members 24 are inclined in a clockwise direction in FIG. 20 in the synchronization operation, so that speed-gear side edge portions of end portions of the lever members 24 are contacted with the projections 22c at the points Z, that is, at positions a-length L3 apart from the point X toward the synchronizer ring 22 in the axial direction. The length L3 is approximately the same as a thickness of the lever member 4.

Therefore, actual force F2 that presses the synchronizer ring 22 at the points Y toward the right side in the axial direction is expressed as follows.

$$F2 = F1 \cdot L2/L1 - F3 \cdot L3/L1$$

The synchronization performance is decreased because of the existence of $F3 \cdot L3/L1$, where L3 is not a negligible value because it has a length almost the same thickness of the lever member 24

FIG. 22 shows an upper half of a main part of another conventional shift device for obtaining a fifth speed and reverse speed used in a forward five-speed transmission. A sleeve 20 can be meshed with clutch teeth of a not-shown fifth-speed gear when it is moved toward a right side in FIG. 22, while it can be meshed with a not-shown reverse gear when it is moved toward a left side in FIG. 22.

When the sleeve 20 is moved and pushes lever member 24 (In this case, two lever members) toward the left side in FIG. 22, not-shown force F1 acts from the sleeve 20 to the lever members 24 at contact points W thereof, which function as the point of effort during a synchronization operation to press the lever member 24 toward the left side. The lever members 24 turn in a counterclockwise direction around contact points V of the lever members 24 and edge of the hub 12, where the contact points V function as the supporting points in the leverage operation. The lever members 24 act force F2 on the synchronizer ring 22 toward the right side in the axial direction in FIG. 22 at contact points U of the lever members 24 and the synchronizer ring 22.

Thus, the synchronizer ring 22 is pressed on a friction surface of the fifth-speed gear to perform the synchronization operation. This decreases rotational speed of a shaft freely supporting the fifth-speed gear that is held because a vehicle stops. Accordingly, a gear noise is avoided when the sleeve 20 meshes with a not-shown reverse gear.

In this operation, projections 22c of the synchronizer ring 22 contact with and act force F3 on the lever members 24 outwardly in a radial direction at points Z due to friction torque generated between not-shown friction surfaces of the synchronizer ring 22 and the fifth-speed gear.

A relationship among the forces F1, F2 and F3 becomes as follows.

$$F2=F1 \cdot L2'/L1'+F3 \cdot L3'/L1'$$

where L1' is a length between the point V of the support and the point U of action, L2' is a distance between the point V of support and the point U of effort, and L3' is a length between the point V of the support and the point Z of the projection 22c and the lever member 24.

L3' is very small, so that an addition F3·L3'/L1' of the force F2 is also small. Thus, its synchronization performance cannot be sufficiently increased.

It is, therefore, an object of the present invention to provide a shift device with a synchronizer which overcomes the foregoing drawbacks and can improve the synchronization performance.

SUMMARY OF THE INVENTION

According to a first aspect of the present invention, there is provided a shift device with a synchronizer including a shaft, a hub, a sleeve, a speed gear, a synchronizer ring, and a plurality of lever members. The shaft is capable of transmitting a power. The hub is fixed on the shaft. The sleeve is supported on the hub slidably in an axial direction, being provided with splines. The speed gear is provided with a cone surface and splines that are capable of engaging with the splines of the sleeve. The synchronizer ring is formed with a plurality of projections extending in an axial direction toward the hub and also with a plurality of pressure receiving surfaces. The lever members are formed like a plate, being arranged among the sleeve, the hub, and the synchronizer ring. The lever members are provided with a top portion and arm portions. The top portions are contactable with the slanted surfaces of the sleeve to function as points of effort in the leverage operation. The top portions of the lever members are capable of contacting the slanted surfaces of the sleeve to function as the points of effort in the leverage operation using the lever members. The arm portions of the lever members extend in a direction departing from the top portion, and are capable of contacting the hub to function as the points of support in the leverage operation. Press surfaces of the lever members formed between the points of effort and the points of support are capable of contacting the pressure receiving surfaces of the synchronizer ring to function as the points of action. Action surfaces are located at speed-gear sides of the lever members and between the points of effort and the points of support to be contactable with the synchronizer ring to function as points of action in the leverage operation. The lever members are provided with a plurality of torque receiving portions capable of receiving torque from the projections of the synchronizer ring. Contact positions of the torque receiving portions and the projections in a synchronization operation when the sleeve is moved toward the speed gear are set at a hub side of the lever members and an axial-directional distance between the points of support and the contact positions is less than a thickness of the lever member.

Therefore, the shift device with the synchronizer according to the present invention can provide the following advantages. The shift device of the first invention can decrease the reduction torque value generated at the contact points of the torque receiving portions of the lever members and the projections of the synchronizer ring, which is generated due to the friction torque during the synchronization operation when the sleeve is moved toward the speed gear. This enables a synchronization performance of the shift device to be improved, decreasing an operational force of a driver or an actuator, thereby improving an operational feeling during a shift operation.

Specially, the advantages become higher in a case where the lever members are small in the radial direction. There is no need to employ a multi-cone type synchronizer, so that it can decrease its manufacture costs.

According to a second aspect of the present invention, there is provided a shift device with a synchronizer including a shaft, a hub, a sleeve, a speed gear, a synchronizer ring, and a plurality of lever members. The shaft is capable of transmitting a power. The hub is fixed on the shaft. The sleeve is provided with splines and slanted surfaces, being supported on the hub slidably in an axial direction. The speed gear is provided with a cone surface and splines that are capable of engaging with the splines of the sleeve. The synchronizer ring is formed with a plurality of projections extending in an axial direction toward the hub and also with a plurality of pressure receiving surfaces. The lever members have a top portion and arm portions extending in a direction depart from the top portion. The top portions are contactable with the slanted surfaces of the sleeve to function as points of effort in a leverage operation. The arm portions of the lever members are contactable with hub to function as points of support in the leverage operation. Action surfaces are located at speed-gear sides of the lever members and between the points of effort and the points of support to be contactable with the synchronizer ring to function as points of action in the leverage operation. The lever members are provided with a plurality of torque receiving portions that are capable of receiving torque from the projections of the synchronizer ring. Contact positions of the torque receiving portions and the projections in a synchronization operation when the sleeve is moved to a direction opposite to the speed gear are set at a hub side of the lever members and within an axial-directional distance being less than a thickness of the lever member between the points of support and the contact positions.

Therefore, the shift device with the synchronizer according to the present invention can provide the following advantages. The shift device of the second invention can increase the friction torque because of addition of torque generated at the contact points of the torque receiving portions of the lever members and the projections of the synchronizer ring, which is generated due to the friction torque during the synchronization operation when the sleeve is moved in the direction opposite to the speed gear. This enables a synchronization performance of the shift device to be improved, decreasing an operational force of a driver or an actuator, thereby improving an operational feeling during a shift operation.

Specially, the advantages become higher in a case where the lever members are small in the radial direction. There is no need to employ a multi-cone type synchronizer, so that it can decrease its manufacture costs.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Figure 1:
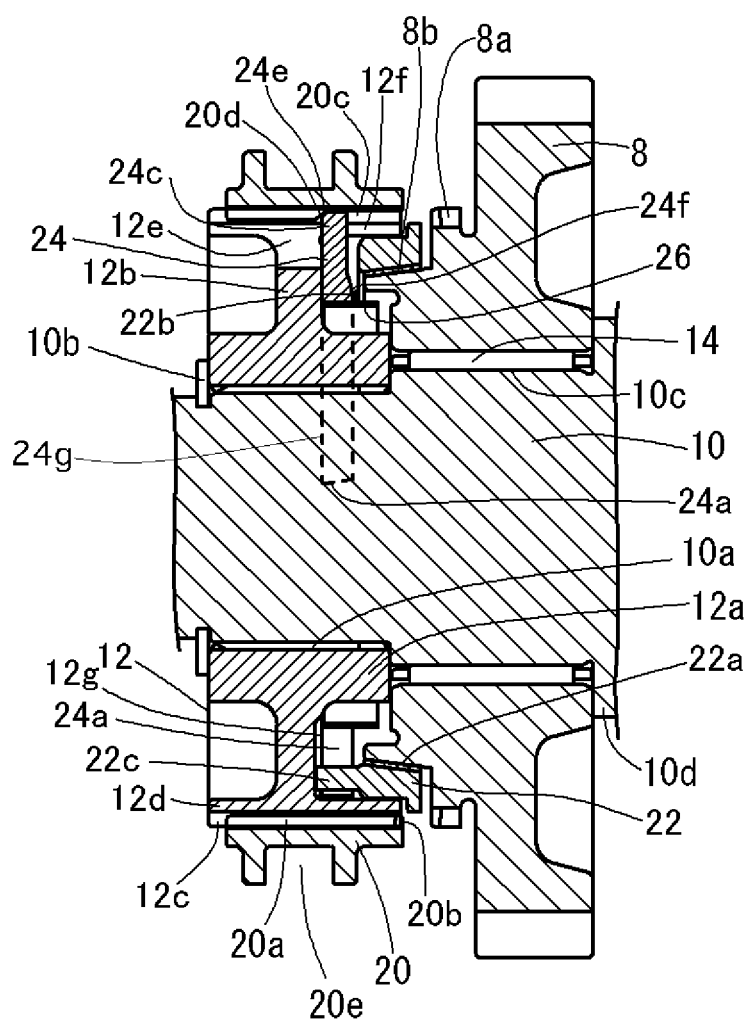
FIG. 1 is a cross sectional side view showing a shift device with a synchronizer of a first embodiment according to the present invention, taken along a line A-O-A in FIG. 2.

Throughout the following detailed description, similar reference characters and numbers refer to similar elements in all figures of the drawings, and their descriptions are omitted for eliminating duplication.

Referring to FIGS. 1 to 5 of the drawings, there is shown a first preferred embodiment of a shift device with a synchronizer according to the present invention, which is used for a transmission of a motor vehicle. In the first embodiment, the shift device is capable of being selectively shifted between a neutral position and a reverse position in the transmission.

The shift device includes an output shaft 10, a hub 12, a reverse-speed gear 8, a sleeve 20, a synchronizer ring 22, two lever members 24, and a spring 26.

The output shaft 10 is connected with a pair of drive wheels through a not-shown final unit having differential gears. The output shaft 10 is provided with outer splines 10a on an external surface of a left side portion thereof in FIG. 1. The outer splines 10a are engaged with inner splines formed on an inner surface of a boss portion 12a of the hub 12, and the hub 12 is restrained from moving in an axial direction, being sandwiched between a snap ring 10b and a large-diameter portion 10c formed at a right side of the output shaft 10.

The reverse-speed gear 8 is rotatably supported on the large-diameter portion 10c of the output shaft 10 through a bearing 14 between the hub 12 and a flange portion 10d formed on the right edge portion of the output shaft 10.

The reverse-speed gear 8 is always engaged with a not-shown idle gear, which is further always engaged with a not-shown reverse-speed drive gear fixed on a not-shown input shaft that is capable of receiving power from an engine. The reverse-speed gear 8 is integrally formed with a plurality of outer splines 8a at the hub side thereof and further with a cone surface 8b at its hub side. Incidentally, the reverse-speed gear 8 corresponds to a speed gear of the present invention.

Figure 2:
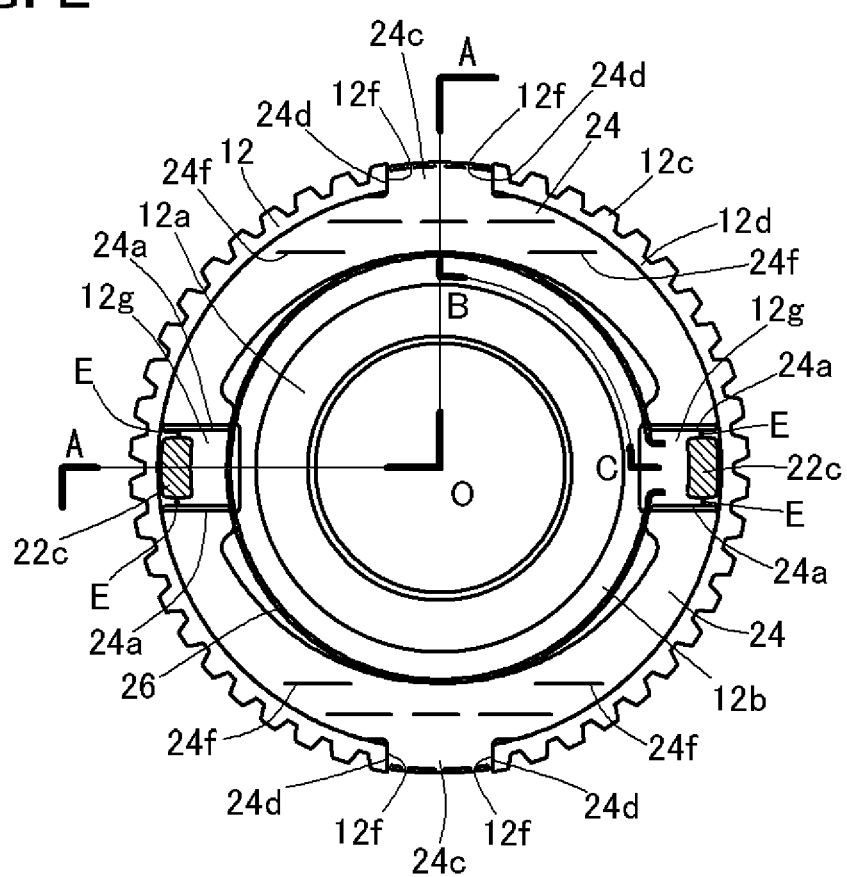
FIG. 2 is a front view showing a main part of the shift device of the first embodiment where two lever members and a spring are set on a hub.

As shown in FIGS. 1 and 2, the hub 12 has the boss portion 12a, a flange portion 12b extending from the boss portion 12a outwardly in the radial direction, and an annular portion 12d formed on an outer circumferential end portion of the flange portion 12d. The annular portion 12d is formed with a plurality of outer splines 12c on its outer surface.

Two cut-off portions 12e are formed in the flange portion 12b of the hub 12 to extend from the annular portion 12 to the flange portion 12b. On the both sides in a rotational direction of the cut-off portions 12e, guide surfaces 12f are formed.

Two recessed portions 12g are formed on a reverse-speed-gear side of the flange portion 12b, being positioned in a 90 degree phase shift from those of the cut-off portions 12e. The recessed portions 12g are provided with an edge 12h, which is capable of contacting with a hub-side side surface of the lever member 24 to function as a point of support in the leverage operation using the lever members 24 during the synchronization operation.

The sleeve 20 is arranged on the outer side of the annular portion 12d of the hub 12 in such a way that inner splines 20a formed on the inner surface of the sleeve 20 are always engaged with the outer splines 12c of the annular portion 12d of the hub 12 so as to be movable relative to the hub 12 in the axial direction. That is, in a state where the shift operation to the reverse speed position is ended, the sleeve 20 is moved toward the right side in FIG. 1 and its inner splines 20a are engaged with the outer splines 8a of the reverse-speed gear 8. The inner splines 20a are formed with chamfers 20b at the reverse-speed-gear side end portions thereof.

When sleeve 20 is positioned at a position shown in FIG. 1, the inner splines 20a of the sleeve 20 are disengaged from the outer splines 8a of the reverse-speed gear 8, so that the output shaft 10 is free from the reverse-speed gear 8, thereby being not driven in a reverse direction.

Figure 3:
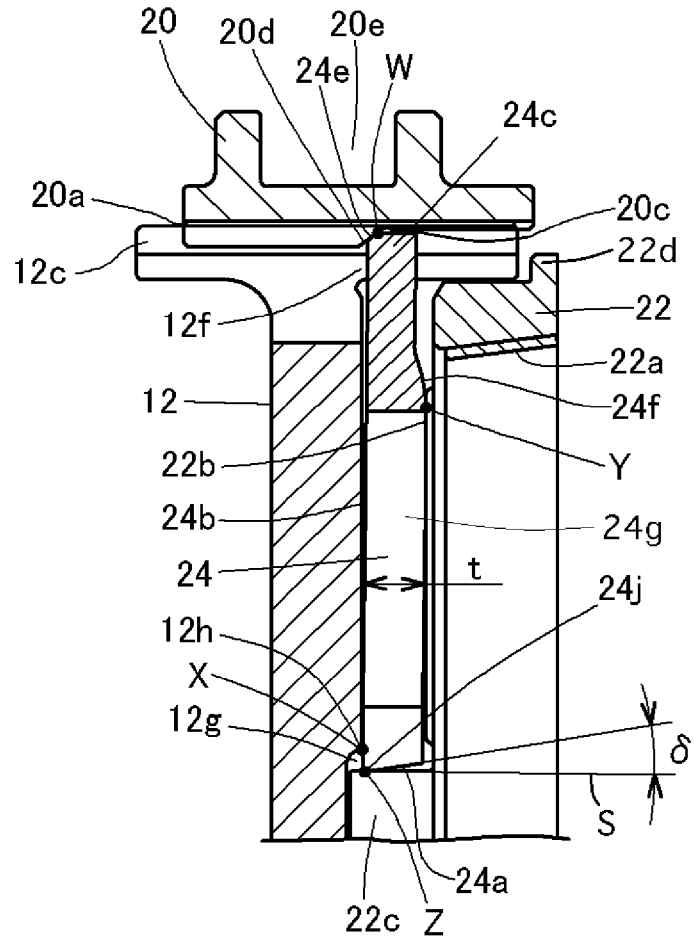
FIG. 3 is a cross sectional side view explaining an operation of leverage operation using the lever members, taken along a line A-B in FIG. 2.

The inner splines 20a are formed with two cut-off portions 20c at positions corresponding to the cut-off portions 12e of the hub 12 to receive the lever members 24. The cut-off portions 20c are formed with a slanted surface 20d. As shown in FIG. 3, the slanted surfaces 20d press top portions 24c of the lever members 24 in the axial direction to function as the points of effort during the synchronization operation.

The sleeve 20 is formed on an outer peripheral surface thereof with shift-fork groove 20e, which is engaged with a not-shown shift fork that is moved in the axial direction by a driver or a not-shown actuator. The shift fork can move the sleeve 20 between the neutral position shown in FIG. 1 and the reverse speed position where the inner splines 20a engage with the splines 8a.

The synchronizer ring 22 is arranged between the hub 12 and the reverse-speed gear 8 in the axial direction. As shown in FIGS. 1 to 3, the synchronizer ring 22 is provided on an inner surface thereof with a friction surface 22a shaped like a cone and facing to the cone surface 8b of the reverse-speed gear 8. The synchronizer ring 22 is formed with two projections 22c at positions corresponding to the recessed portions 12g of the hub 12 and further with two pressure receiving surfaces 22b between the projections 22c at the hub side thereof. The projections 22c project in the axial direction toward the hub 12, and they are capable of contacting with and pressing the lever members 24 outwardly in the radial direction, respectively. Namely, each projection 22c press an edge 24j of a torque receiving portion 24a of the corresponding lever member in a circumferential direction when the synchronizer ring 22 is rotated due to the friction torque generated during the synchronization, thereby pressing the lever member 24 outwardly in the radial direction.

As shown in FIG. 3, the pressure receiving surfaces 22b are capable of being respectively pressed in the axial direction by the lever members 24 during the synchronization operation, and the contact points Y of the pressure receiving surfaces 22b and the lever members 24 function as the points of action in the leverage operation using the lever members 24.

As shown in FIG. 1, the two lever members 24 are symmetrically arranged among the synchronizer ring 22, the hub 12 and the sleeve 20. They are press-formed from a plate having a thickness "t" as shown in FIG. 3 to obtain a shape like an arc as shown in FIG. 2 when they are seen from a right side in FIG. 1. Each lever member 24 has two torque receiving portions 24a at the both ends of the lever members 24. The torque receiving portions 24a of the lever members 24 are formed on both end portions of arm portions 24g extending from the top portions 24c, being arranged between the projections 22c of the synchronizer ring 22 so that outer side surfaces (thickness-directional surfaces) of the torque receiving portions 24a can contact with the outer side surfaces of the projections 12g.

Incidentally, FIG. 2 shows a neutral state of the synchronizer ring 22 in the rotational direction, where four clearances E exist in the rotational direction between the outer side surfaces of the projections 12g and the bottom surfaces of the torque receiving portions 24a, respectively. That is, the synchronizer ring 22 can rotate by an angle corresponding to the clearance E in a clockwise direction and also in a counterclockwise direction from the neutral state relative to the lever members 24 and the hub 12.

The bottom surfaces of the torque receiving portions 24a are inclined at an angle δ relative to an axial line S indicated in FIG. 3, and the torque receiving portions 24a are formed with edges 24j at the hub side thereof, respectively. Accordingly, press force due to the friction torque from the projections 22c of the synchronizer ring 22 during the synchronization operation acts on the edges 24j of the torque receiving portions 24a.

Incidentally, the edges 24j may be formed as a slightly rounded edge to remove a sharp angle thereof. The contact points of the torque receiving portions 24a and the projections 22c are formed by one of slanted surfaces, curved surfaces and cut-off portions that are provided on at least one of the torque receiving portions 24a and the projections 22c.

The lever members 24 have back surfaces (hub side surfaces) 24b on the hub-sides thereof as shown in FIG. 3, and the back surfaces 24b can contact with the edges 12h of the hub 12 at the portions 12h corresponding to the contact points X shown in FIG. 3 to function as the points of support in the leverage operation using the lever members 24 during the synchronization operation, respectively.

Each of the lever members 24 has the top portion 24c corresponding to the cut-off portion 12e of the hub 12. The both side surfaces 24d of the top portion 24c in the rotational direction correspond to the guide surfaces 12g of the hub 12, respectively, so that the lever members 24 can move along the guide surfaces 12g inwardly in the radial direction and swing to perform the leverage operation, which will be later explained.

As shown in FIG. 3, the hub sides of the top portions 24c are formed as a slanted surface 24e so that the slanted surface 20d of the sleeve 20 can press the slanted surfaces 24e of the lever members 24 in the axial direction at the contact points W thereof.

On the synchronizer-ring sides of the lever members 24, action surfaces 24f are formed to correspond to the pressure receiving surfaces 22b of the synchronizer ring 22. The action surfaces 24f have a curved surface in such a way that the lever ratio of the lever members 24 does not vary in a case where the lever members 24 are inclined when they press the pressure receiving surfaces 22b of the synchronizer ring 22 during the synchronization operation.

As explained above, the contact points W, Z, and Y where the lever members 24 contact with the sleeve 20, the hub 12, and the synchronizer ring 22 function as the points of effort, the points of support, and the points of action, respectively.

A spring 26 is arranged at the inner sides of the lever members 24. The spring 26 comprises a leaf spring, having a shape like a letter C as shown in FIG. 2. It pushes to expand the two lever members 24 outwardly in the radial direction.

The operation of the shift device of the first embodiment will be described below.

A shift operation from the neutral state to the reverse speed when the output shaft 10 stops and the reverse-speed gear 8 rotates in the clockwise direction, seen from the right side in FIG. 1, will be described.

In FIG. 1, the shift fork moves the sleeve 20 toward the reverse-speed gear 8. Then, the slanted surfaces 20d of the sleeve 20 contact with and press the slanted surfaces 24e of the lever members 24 in the axial direction.

When the sleeve 20 is moved toward the reverse-speed gear 8, they do not move inwardly in the radial direction instantly although the slanted surfaces 24e thereof are pressed by the slanted surface 20d of the sleeve 20, because the lever members 24 are pushed outwardly in the radial direction by the spring 26. This pushing force from the sleeve 20, however, causes the lever members 24 to incline toward the reverse-speed gear 8. Consequently, the action surfaces 24f thereof press the pressure receiving surfaces 22b of the synchronizer ring 22 in the axial direction, so that the friction surface 22a of the synchronizer ring 22 is pressed on the cone surface 8b of the reverse-speed gear 8.

Then, friction torque generates in the rotational direction between the friction surface 22a and the cone surface 8b because there is a rotational speed difference between the output shaft 10 and the reverse-speed gear 8. The friction torque rotates the synchronizer ring 22 in the clockwise direction in FIG. 2 relative to the hub 12 and the lever members 24 to clear the clearances E so as to face chamfers of the inner splines 20a and the outer splines 22d to each other to prevent the sleeve 20 from further advancing toward the reverse-speed gear 8.

That is, the friction torque acting on the synchronizer ring 22 is transmitted from the projections 22c thereof to the torque receiving portions 24a of the lever members 24 to push the lever members 24 outwardly in the radial direction.

FIG. 3 shows a state where the projections 22c contact with the torque receiving portions 24d to push them in the circumferential direction. Specifically, the bottom surfaces of the torque receiving portions 24d are formed as the slanted surfaces with the degrees δ, so that the friction torque is transmitted at the contact points Z of the edges 24j of the lever members 24 and the outer side surfaces of the projections 22c. The contact points Z exist at approximately the same positions as those of the contact points X in the axial direction. In addition, the length in the radial direction between the contact points Z and the contact points X is set small. Therefore, the reduction torque generated at the contact points Z is decreased than that generated in the conventional shift device.

When the sleeve 20 presses the top portions 24c of the lever members 24 in the axial direction with force F1, the lever members 24 amplify the press force due to the leverage operation thereof and press the synchronizer ring 22 in the axial direction by the amplified force.

Herein, the leverage operation will be explained with reference to a drawing of FIG. 3. The contact points W of the outer-diameter side end portions of the slanted surfaces 20d and the top portions 24c function as the points of effort, the contact points Y of the action surfaces 24e and the pressure receiving surfaces 22b function as the points of action, and the contact points X of the back surfaces 24b and the edges 12h function as the points of support.

Accordingly, the lever ratio is L2/L1, where L1 is a distance between the point of support and the point of action, and L2 is a distance between the point of support and the point of effort. Then the press force from the lever members 24 to the synchronizer ring 22 is F1·L2/L1. The reduction torque is negligible.

During this time, the projections 22c of the synchronizer ring 22 press the torque receiving portions 24h of the lever members 24 in the circumferential direction, receiving the friction torque generated between the friction surface 22e and the cone surface 8b.

The angles of the friction surface 22e and the cone surface 8b in addition to the angle of the slanted surfaces 20d are set in such a way that the outwardly press force becomes larger than those of the lever members 24 being pressed inwardly in the radial direction by the slanted surfaces 20d of the sleeve 20.

Such a setting can prevent the sleeve 20 from pressing the lever members 24 inwardly in the radial direction and also from advancing toward the reverse-speed gear 8 as far as the friction torque exists between the friction surface 22e and the cone surface 8b.

Therefore, while there is a rotational speed difference between the output shaft 10 and the reverse-speed gear 8, the sleeve 20 keeps pressing the synchronizer ring 22 in the axial direction due to the leverage operation through the lever members 25. As a result, the synchronization operation is performed between the friction surface 22e and the cone surface 8b.

When the synchronization operation makes progress and the rotational speed difference becomes zero, the friction torque between the friction surface 22e and the cone surface 8b vanishes. As the friction torque vanishes, the slanted surfaces 20d of the sleeve 20 pressed to move the lever members 24 inwardly in the radial direction through the slanted surfaces 20d and 24e against the elastic force of the spring 26 and the centrifugal force acting on the lever members 24, and the sleeve 20 becomes capable of further advancing toward the reverse-speed gear 8, rotating the synchronizer ring 22 and the reverse-speed gear 8 through the chamfers the inner splines 20a and the splines 22d, 8a, respectively.

At this time, the synchronization operation ends, the sleeve 20 further advances toward the reverse-speed gear 8, pushing the lever members 24 inwardly in the radial direction. The splines 20a and the splines 8a are engaged with each other, which is an end of the shift operation to the reverse speed.

Herein, a comparison of the lever ratios between the conventional shift device and the first embodiment will be explained.

In the conventional shift device, the actual lever ratio becomes smaller because of the non-negligible reduction torque being generated at positions far from the contact points X (Corresponding to the points of support) by the press force acting outwardly in the radial direction from the projections 22c to the torque receiving portions 24a due to the friction torque.

On the contrary, in the shift device of the first embodiment, the bottom surfaces of the torque receiving portions 24a are slanted toward the hub side to have the degrees δ, so that the axial-directional distance between the contact points X and the contact points Z of the projections 22c and the torque receiving portions 24a can be small, substantially zero. For example, even in a case where the edges 24j is slightly rounded or chamfered, the length L3 becomes almost 0. Therefore, the reduction torque becomes negligible, which improves the synchronization performance because the actual lever ratio becomes larger.

That is, the force F2 is large, so that the length L3 greatly affects the actual lever ratio. When each lever member 24 has a thickness "t", the distance L3 becomes approximately the same as the thickness "t" in the conventional shift device, while it can be set less than the thickness t, smaller than ½·t for example, in the first embodiment.

Incidentally, although the torque receiving portions 24a are formed to have the slanted surfaces in the first embodiment, they are not limited to the slanted surfaces. They may be formed appropriately as long as the contact points of the projections 22c and the torque receiving portions 24a are positioned at the points-of-support sides relative to those in the conventional shift device shown in FIG. 20. In other words, when the distance L3 extends in a direction opposite to that in the conventional shift device, the synchronizer performance is further improved.

Figure 4:
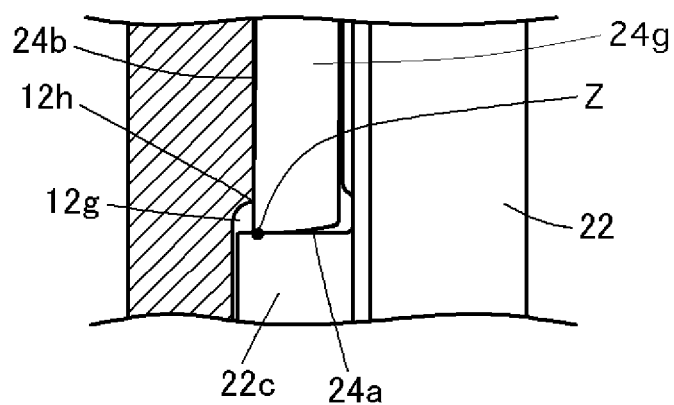
FIG. 4 is an expanded side view showing another configuration of a torque receiving portion of the lever member.
Figure 5:
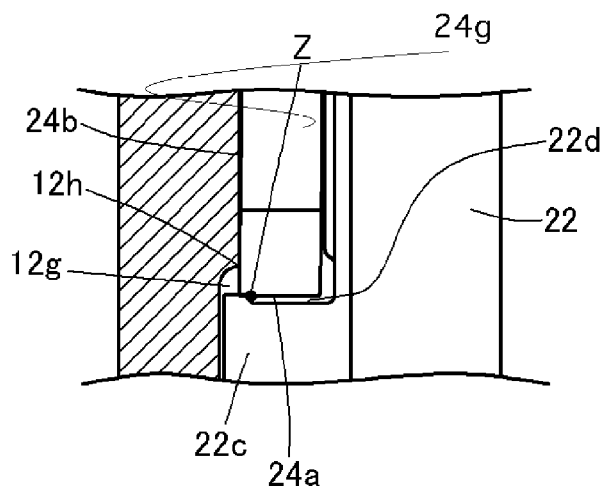
FIG. 5 is an expanded side view showing the other configuration of a torque receiving portion of the lever member.

The torque receiving portions 24 may be to formed have a curved surface as shown in FIG. 4 to set the axial-directional distance between the contact points Z and the projections 22c to be below ½ of the thickness of the lever members 24, or they may be formed by the projections 22c with cut-off portions 22d as shown in FIG. 5 so that the contact points Z become closer to the contact points X in the radial direction.

As described above, the shift device of the first embodiment can decrease the value of the reduction torque, thereby improving its synchronization performance without increasing its size and adding other parts.

Next, a shift device of a second embodiment will be described with reference to drawings of FIGS. 6 to 18.

Figure 6:
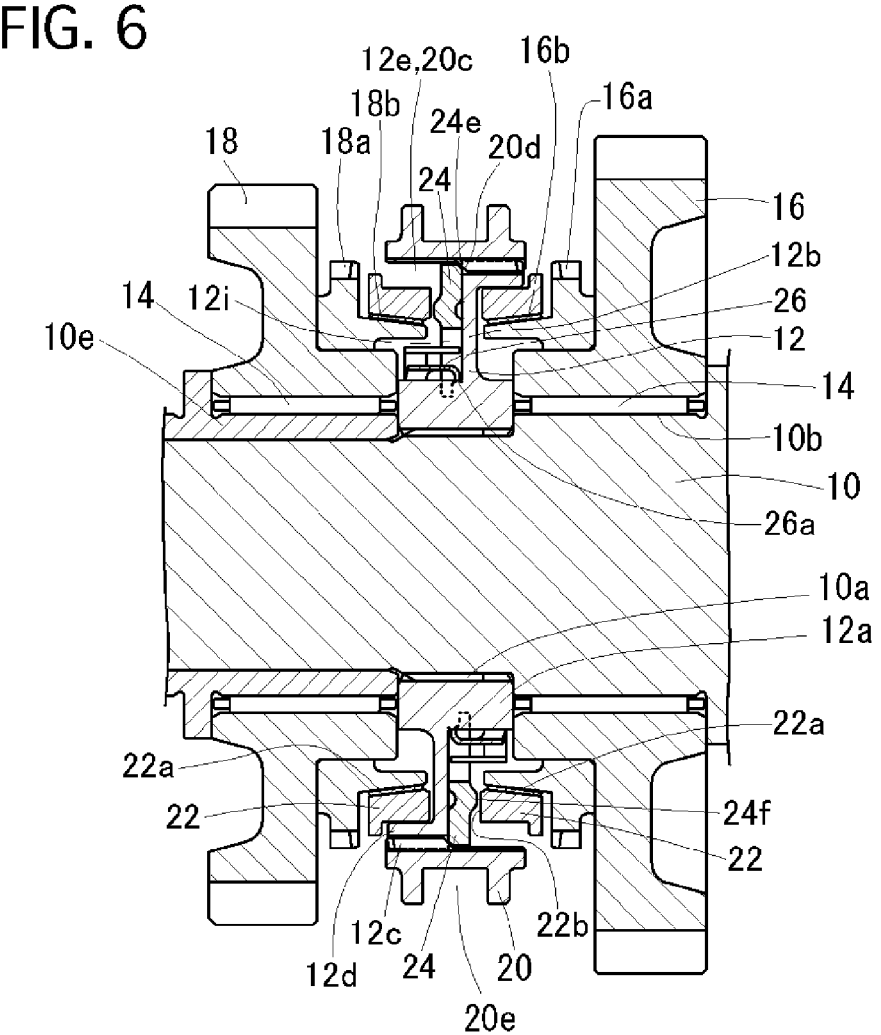
FIG. 6 is a cross sectional side view showing a shift device with a synchronizer of a second embodiment according to the present invention.

As shown in FIG. 6, the shift device of the second embodiment has a first speed gear 16 and a second speed gear 18, being rotatably supported on an output shaft 10 and a bush 10e through the bearings 14, at the both sides of a hub 12 in an axial direction, respectively. The bush 10e is fixed on the output shaft 10 at a left side of the output shaft 10 in FIG. 6. Two synchronizer rings 22 are respectively arranged at the both sides of the hub 12, namely at a first-speed-gear side and a second-speed-gear side of the hub 12, respectively, corresponding to the first speed gear 16 and the second speed gear 18.

The first speed gear 16 and the second speed gear 18 are always engaged with not-shown first speed drive gear and not-shown second speed drive gear, respectively, which are supported on a not-shown input shaft parallel to the output shaft 10.

Figure 7:
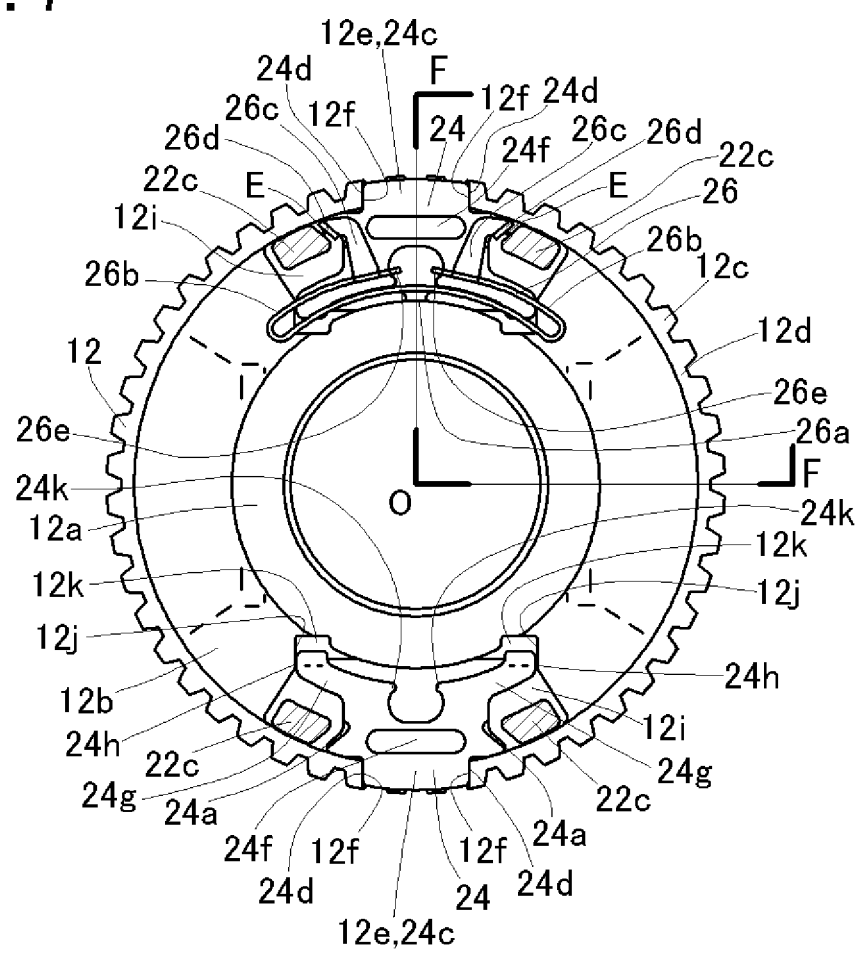
FIG. 7 is a front view showing a main part of the shift device of the second embodiment where two lever members and two springs (only upper one of the springs is illustrated for easily understanding) are set on a hub.
Figure 8:
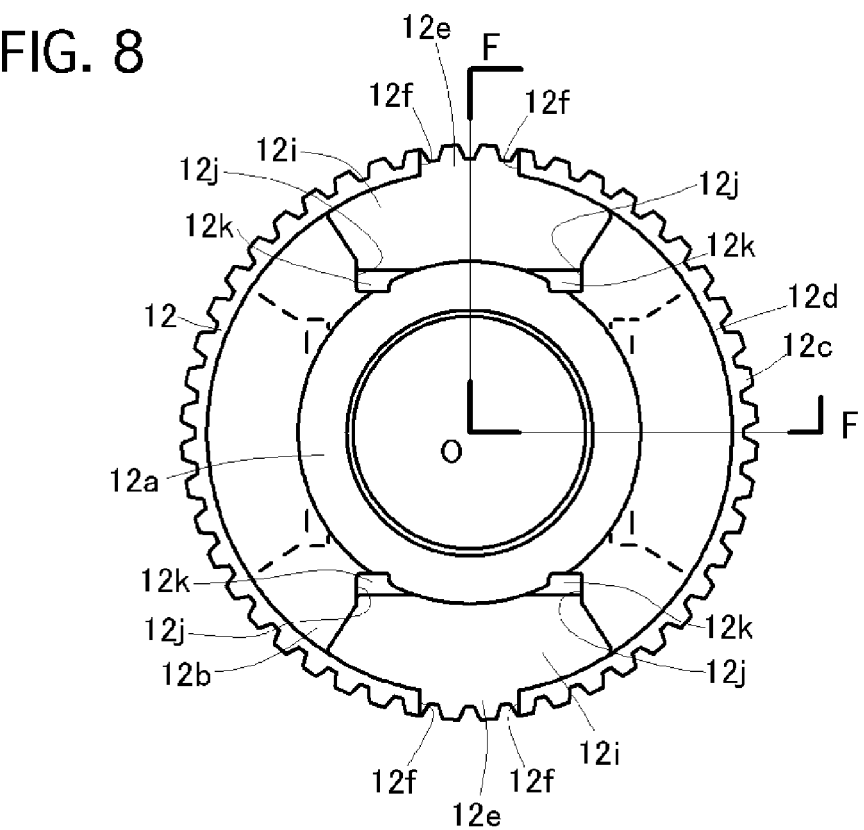
FIG. 8 is a front view showing the hub of the shift device of the second embodiment, seen from a right side in FIG. 6.
Figure 9:
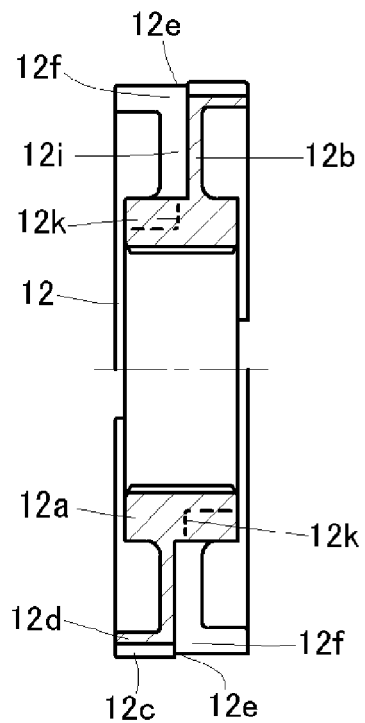
FIG. 9 is a cross sectional side view of the hub, taken along a line F-O-F in FIGS. 8 and 9.

The hub 12 is shown in FIGS. 7 to 9. It is formed with two cut-off portions 12e and two recessed portions 12i connecting with the cut-off portions 12e on each of the first-speed-gear side and the second-speed-gear side of the hub 12. The cut-off portions 12e and the recessed portions 12i are arranged with a 90 degree phase shift between at the first-speed-gear side and at the second-speed-gear side.

Second guide surfaces 12j are formed on the both sides in the rotational direction of the recessed portions 12j so as to guide the lever members 24, which will be later described. Four supporting surfaces 12k are formed on each of the inner sides in the radial direction, the deepness of the supporting surfaces 12k being set swallower in the axial direction than those of the recessed portions 12i.

Figure 10:
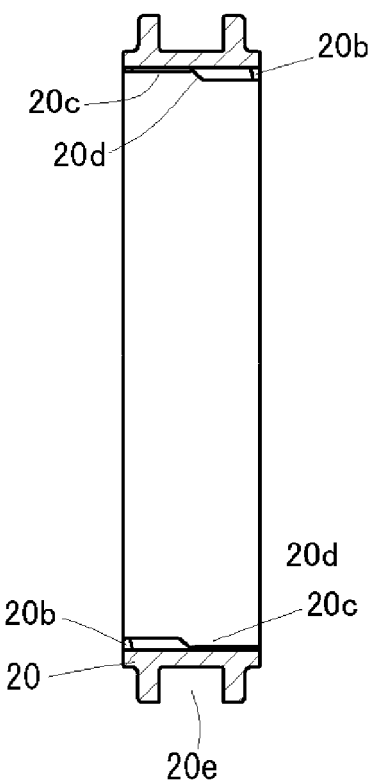
FIG. 10 is a cross sectional view showing a sleeve of the shift device of the second embodiment, taken along a line F-O-F in FIGS. 8 and 9, although the sleeve is not illustrated in FIGS. 8 and 9.

As shown in FIG. 10, the sleeve 20 has inner splines 20a, each of which are formed with two cut-off portions 20c and two slanted surfaces 20d on the inner splines 20a that correspond to the cut-off portions 12e of the hub 12 at each of the first-speed-gear side and at the second-speed-gear side.

Figure 11:
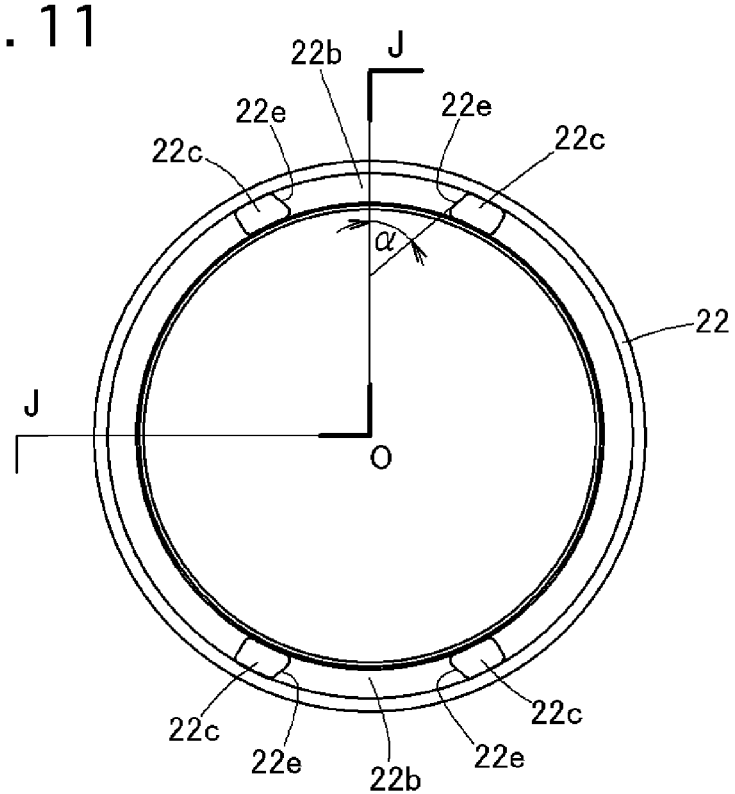
FIG. 11 is a view showing a front view showing a synchronizer ring of the shift device of the second embodiment.
Figure 12:
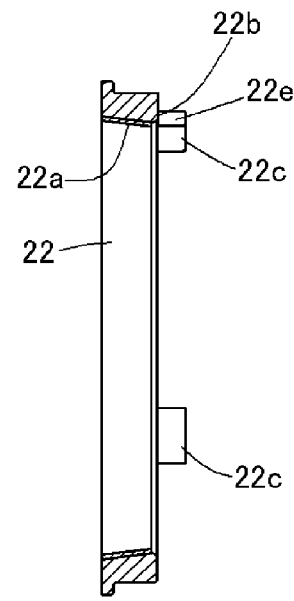
FIG. 12 is a cross sectional side view showing the synchronizer ring, taken along a line J-O-J in FIG. 11.

The synchronizer rings 22 are formed with pressure receiving surfaces 22b at the hub side thereof, being provided with a pair of projections 22c on two positions of each of the synchronizer rings 22 corresponding to the two recessed portions 12i of the hub 12 as shown in FIGS. 11 and 12. Slanted surfaces 22e are formed on the projections 22c to have an angle of a relative to a line extending along the line J-O passing through the midst of the pair of projections 22c. The slanted surfaces 22e are capable of pushing the lever members 24 outwardly in the radial direction during a synchronization operation. Incidentally, the slanted surfaces 22e are not limed to a flat surface, and they may be formed as a curved surface with a large radius.

Figure 13:
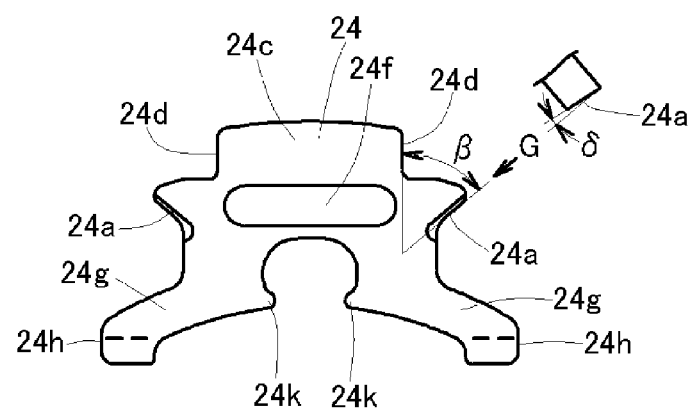
FIG. 13 is a front view showing the lever member that is used in the shift device of the second embodiment.
Figure 14:
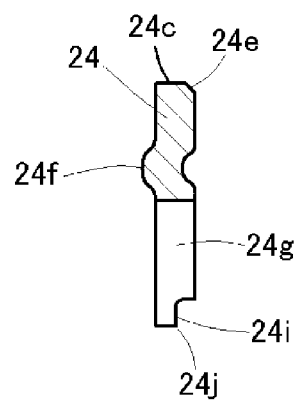
FIG. 14 is a cross sectional side view showing a central portion of the lever member.

The lever members 24 are press-formed from plates to have a shape shown in FIGS. 13 and 14. They have a top portion 24c at a central position thereof and two arm portions 24g extending from the both sides of the top portion 24c. The arm portions 24g have configurations corresponding to the recessed portion 12i of the hub 12, being formed with slide surfaces 24h at the both end portions of the arm portions 24g. The slide surfaces 24h have a configuration corresponding to the second guide surfaces 12j of the hub 12. Accordingly, the lever members 24 are capable of moving in the radial direction and also in the axial direction and swinging relative to the hub 12.

The top portions 24c are formed with a slanted surface 24e at the hub sides thereof, and the top surfaces 24e are capable of contacting with the slanted surfaces 20d of the sleeve 20, respectively, so as to function as points W of effort in the leverage operation using the lever members 24. In addition, supporting surfaces 24i are formed on the both end portions of the arm portions 24g to have a step. Edges 24j, which are formed at the inner side in the radial direction of the supporting surfaces 24i and at the synchronizer-ring side, are capable of contacting with the supporting surfaces 12k of the hub 12 during the synchronization operation so as to function as the points X of support in the leverage operation.

Central portions of the lever members 24 are provided with an action surface 24f that projects toward the corresponding synchronizer ring 22. The contact points of the action surfaces 24f and the pressure receiving surfaces 22b function as the points Y of action in the leverage operation.

Figure 18:
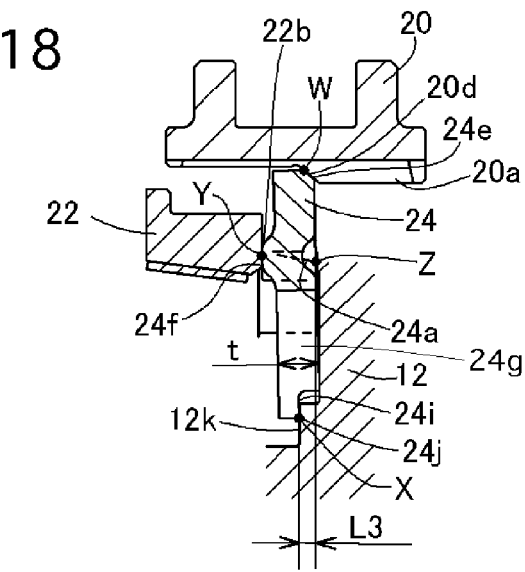
FIG. 18 is a cross sectional side view explaining a leverage operation using the lever member in the shift device of the second embodiment.

Torque receiving portions 24a are provided on the both sides of the top portions 24e to correspond to the slanted surfaces 22e formed on the projections 22c of the synchronizer rings 22, respectively. That is, the friction torque acting on the synchronizer ring 22 is transmitted from the slanted surfaces 22e of the projections 22c of the synchronizer ring 22 to the torque receiving portions 24a of the lever members 24, so that the lever members 24 are pressed to move outwardly in the radial direction. The contact points of the slanted surfaces 22e and the torque receiving portions 24a are set exist at the positions apart by an axial-directional distance L3 from the points X of support as shown in FIG. 18.

For this purpose, the torque receiving portions 24a have an angle β relative to side surfaces 24d and an angle δ shown by an arrow G in FIG. 13 as well as in the first embodiment. Further, rags 24k, with which springs 26 engage, are provided on the inner sides in the radial direction of the central portions of the lever members 24.

Figure 15:
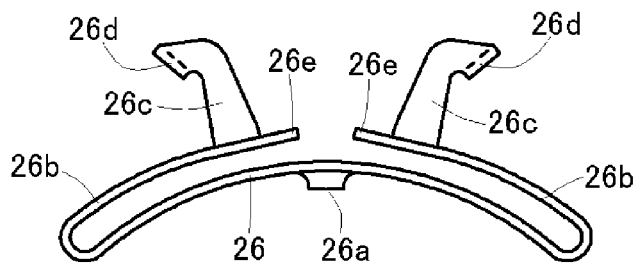
FIG. 15 is a front view showing the spring, seen from a first-speed gear side and a second-speed gear side in FIG. 6.
Figure 16:
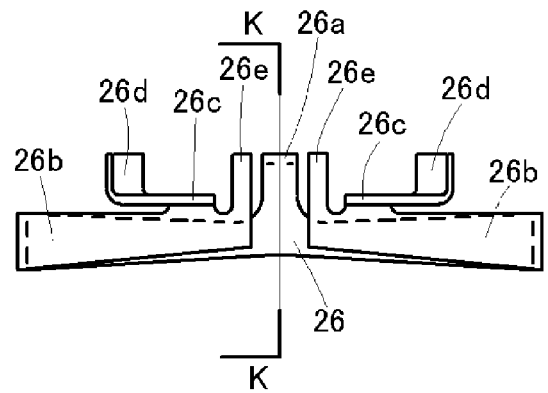
FIG. 16 is a top view showing the spring shown in FIG. 15.
Figure 17:
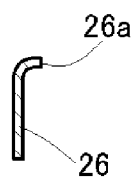
FIG. 17 is a cross sectional side view showing the spring, taken along a line K-K in FIG. 16.

The springs 26 are press-formed from a thin plate to have a configuration shown in FIGS. 15 to 17, which show a configuration state when they are set in the shift device. Specifically, hub side top portions of central portions of the springs 26 are bent to form a seating surface 26a, to which elastic portions 26b are provided symmetrically. Each seating surface 26a contacts with the boss portion 12a of the hub 12 so that the spring 26 can swing together with the corresponding lever member 24 during the synchronization operation.

Each arm portion 26c is provided at an end portion thereof with a press portion 26d that bends outwardly in the radial direction and in the axial direction. The press portions 26d contact the torque receiving portions 24a of the lever members 24 to push the lever members 24 outwardly in the radial direction, being clipped between the torque receiving portions 24a and the projections 22c of the synchronizer rings 22. Therefore, clearances E, which have been explained in the first embodiment, exist between the press portions 26d and the projections 22c as shown in an upper half part of FIG. 7.

In addition, lip portions 26e are formed to respectively extend from inner sides of the both end portions of the elastic portions 26b toward the hub 12. The lip portions 26e are engaged with the rag portions 24k of the lever members 24, so that the springs 26 are engaged with the lever members 24 due to elastic force of the elastic portions 26b.

Accordingly, the springs 26 and the lever members 24 can be assembled as one unit in advance of an assembled state shown in FIGS. 6 and 7.

The operation of the shift device of the second embodiment will be described.

When the output shaft 10 stops its rotation and the second speed gear 18 are rotating in a counterclockwise direction seen from the right side in FIG. 6, a shift operation from a neutral position to a second speed position will be described. Hereafter, the operation of the second embodiment similar to that of the first embodiment will be omitted.

In FIG. 6, a shift fork (not shown) moves the sleeve 20 toward the second speed gear 18. Then, the slanted surfaces 20d of the sleeve 20 contact the slanted surfaces 24e of the lever members 24, so that the lever members 24 are pressed in the axial direction and swing, being urged by the elastic force of the springs 26 outwardly in the radial direction. The action surface 24f presses the pressure receiving surface 22b of the corresponding synchronizer ring 22 in the axial direction. Therefore, the friction surface 22a of the synchronizer ring 22 is pressed on the cone surface 18b of the second speed gear 18b.

As there is a rotational speed difference between the output shaft 10 and the second speed gear 18, the friction torque generated between the friction surface 22a and the cone surface 18b rotates the synchronizer ring 22 in the counterclockwise direction relative to the hub 12 and the lever members 24 to clear the clearances E, pushing the lever members 24 outwardly in the radial direction. The friction torque is transmitted from the projections 22c of the synchronizer ring 22 to the hub-side end portions with the angle δ of the torque receiving portions 24a of the lever members 24 as well as in the operation of the first embodiment.

When the sleeve 20 presses the top portions 24c of the lever members 24, they amplify the press force due to the leverage operation and push the synchronizer ring 22 in the axial direction. Thus, the synchronization operation is carried out similarly to that of the first embodiment.

FIG. 18 is a view explaining the leverage operation, where the hub 12, the sleeve 20 and the lever member 24 are illustrated in enlargement.

As described above, the contact points W of the outer-diameter side end portions of the lever members 4 and the slanted surfaces 20d of the sleeve 20 function as the points of effort, the contact points Y of the action surfaces 24f of the lever members 24 and the pressure receiving surfaces 22b of the synchronizer ring 22 function as the points of action, and the contact points X of the support surfaces 12k of the hub 12 and the edges 24j of the lever members 24 function as the points of support to perform the leverage operation.

The lever ratio is L2/L1, where L1 is a distance between the points of support and the points of action, and L2 is a distance between the points of support and the points of effort, but in actual the friction torque generated between the friction surface 22a and the cone surface 16a affects the lever ratio.

That is, the friction torque is transmitted from the projections 22c to the torque receiving portions 24a of the lever members 24, thereby pushing the lever members 24 outwardly in the radial direction. At this moment, the points Z transmitting the friction torque are positioned closer toward the hub 12 than the points X of support in the conventional shift device. Accordingly, L3, which is indicated in FIG. 18, becomes a negative value in the second embodiment, which increases the lever ratio due to the friction torque.

When the synchronization ends, the sleeve 20 moves toward the second speed gear 18, pushing the lever members 24 to move inwardly in the radial direction. Then, the splines 20a of the sleeve 20 engage with the splines 18a of the second speed gear 18. This is an end of the shift operation to the second speed. Incidentally, a shift operation to the first speed is carried out similarly to the shift operation to the second speed, although the directions of axial movements of the sleeve 20 are opposite to each other between the shift operations to the first speed and the second speed.

The shift device of the second embodiment has the following advantages in addition to those of the first embodiment. In the shift device of the second embodiment, the lever ratio can be increased to improve the synchronization performance, using the influence of the friction torque.

In addition, the axial-directional depths of the support surfaces 12k of the hub 12 are formed swallower than those of the recessed portions 12i, and accordingly the support surfaces 12k at the first speed gear side and the second speed gear side are apart from each other in the axial direction. This enables the portions with the supporting surfaces 12k to increase the thicknesses thereof, thereby ensuring the strength of the hub 12 sufficiently.

Further, the press portions 26d of the springs 26 are clipped between the projections 22c of the synchronizer rings 22 and the torque receiving portions 24e of the lever members 24, and accordingly the durability of the projections 22c against wear is improved in such a case where the lever members 24 are made from steel material and the synchronizer rings 22 are made from copper alloy. The springs 26 are formed to have a clipping function, and accordingly there is no need to increase the number of parts. Further, the lever members 24 and the springs 26 can be preassembled as one unit, and accordingly it becomes easy to assemble them into the shift device.

Next, a shift device of a third embodiment will be described with reference to a drawing of FIG. 19.

The shift device of the third embodiment is constructed similarly to that of the second embodiment except the configurations of lever members 24 and springs 26. That is, the torque receiving portions 24a of the lever members 24 of the third embodiment do not have the slanted surfaces with the angle δ of the second embodiment, and, instead of that, hub-side end portions of the press portions 26d of the springs 26 are bent to form a press surface 26f. Accordingly, the friction torque is transmitted from the projections 22c of the synchronizer ring 22 to the torque receiving portions 24a of the lever members 24 through the press surfaces 26f of the spring 26 during the synchronization operation.

Figure 19:
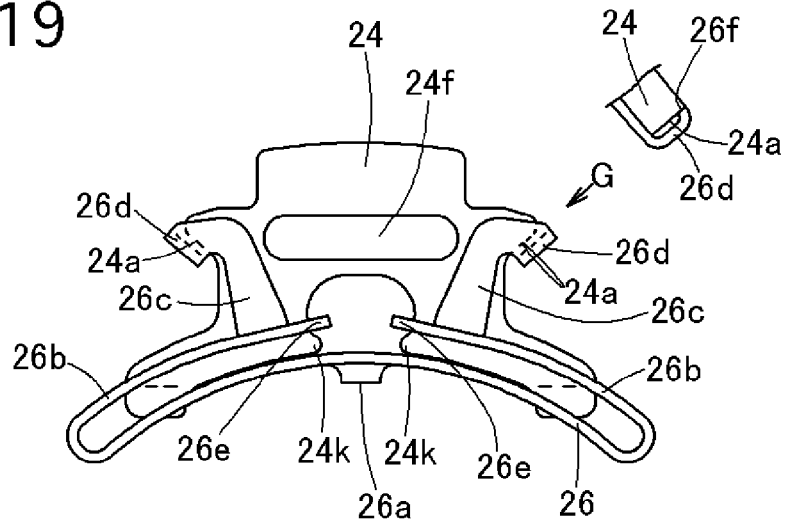
FIG. 19 is a front view showing a lever member and a spring that are used in a shift device with a synchronizer of a third embodiment according to the present invention.

As indicated by an arrow G in FIG. 19, the area of contact points of the press surfaces 26f and the torque receiving portions 24a corresponds to the thickness of a plate forming the spring 26, so that the hub-side end portions of the torque receiving portions 24a are pressed by the projections 22c.

The operation of the shift device of the third embodiment is similar to that of the second embodiment because only the configurations of the contact points of the press surfaces 26f and the torque receiving portions 24a are different from each other. Therefore, an explanation of the operation of the third embodiment is omitted.

The shift device of the third embodiment has the following advantages in addition to those of the second embodiment.

It is not necessary to form the torque receiving members 24a having the slanted surfaces with the angle δ, and accordingly the design freedom of the lever members becomes higher and manufacturing costs thereof can be decreased.

Next, a fourth embodiment of the present invention will be described with reference to a drawing of FIG. 20.

Figure 20:
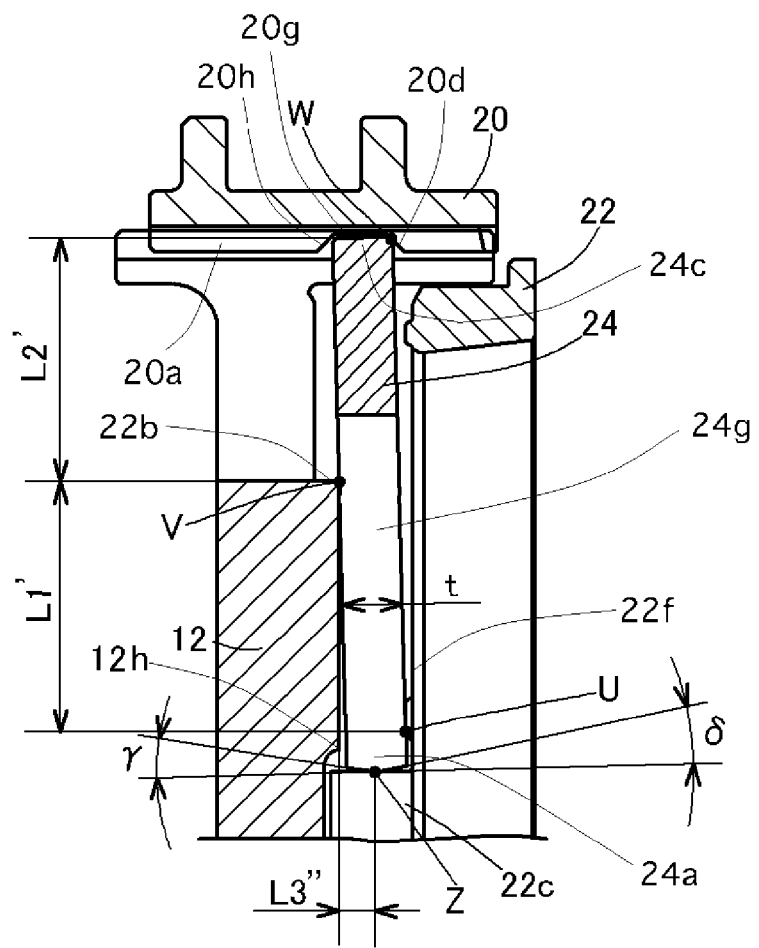
FIG. 20 is a cross sectional side view explaining a leverage operation using lever members used in a conventional shift device.
Figure 21:
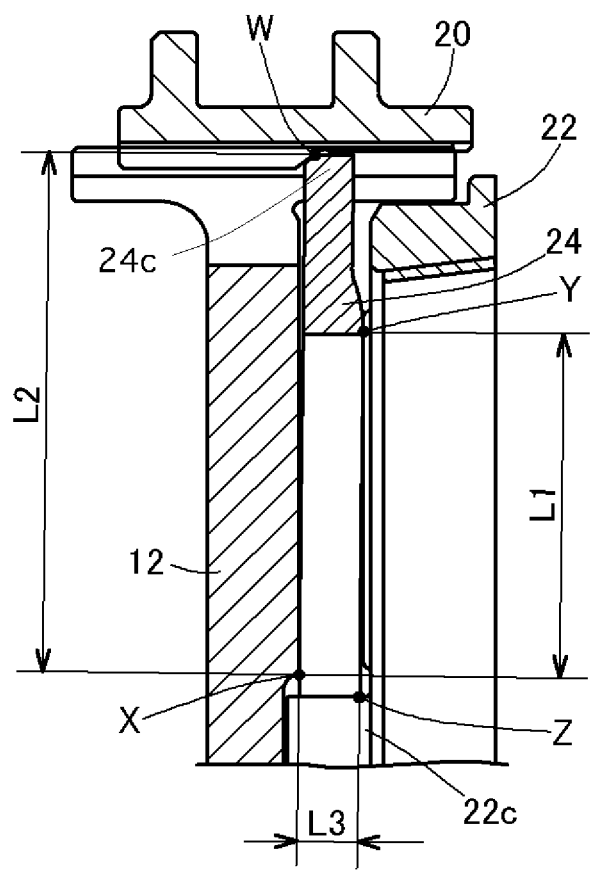
FIG. 21 is a cross sectional side view showing a conventional shift device.

A shift device of the fourth embodiment is different from that of the first embodiment in that a speed gear, which is pressed by a synchronizer ring 22 and not shown in FIG. 20, of the fourth embodiment is a fifth-speed gear. In addition, they are different from each other in that a plurality of lever members 24 (although only one lever member 24 is illustrated in FIG. 20) provide a leverage operation to press the synchronizer ring 22 toward the fifth-speed gear and synchronize the rotational speed of a not-shown input shaft rotatably supporting the fifth-speed gear with that of the fifth-speed gear when a sleeve 20 is moved toward any one of the left and right sides in FIG. 20. FIG. 20 shows a state where the sleeve 20 is moved toward the left side to decrease the rotational speed of the input shaft.

Incidentally, the fifth-speed gear is arranged at a right side of the synchronizer ring 22 in FIG. 20 instead of the reverse-speed gear 8 of the first embodiment shown in FIG. 1.

Specifically, a groove 20g is formed on an inner surface of the splines 20a of the sleeve 20. The groove 20g has a first slanted surface 20d at a right end side of the groove 20g in an axial direction in FIG. 20 and a second slanted surface 20h at a left end side thereof.

Top portions 24c of the lever members 24 are inserted into the groove 20g, and the top portions 24c can contact with one of the first slanted surface 20d and the second slanted surface 20h to form the points W of effort of the leverage action during a synchronization operation.

The lever members 24 have a torque receiving portion 24a that is capable of contacting with a projection 22c of the synchronizer ring 22. The torque receiving portion 24a is formed with slanted surfaces that have an angle δ relative to the axial direction at a synchronizer-ring side similarly to that of the first embodiment shown in FIG. 3 and an angle γ at a hub side. The angle γ determines an axial position where the lever members 24 receive friction torque from the projections 22c of the synchronizer ring 22 when the sleeve 20 is moved toward the reverse position.

The synchronizer ring 22 is formed to have a first pressure-receiving surface 22b and a second pressure-receiving surface 22f at the hub side.

A hub 12 is formed with a second edge 12m at in addition to the first edge 12h of the first embodiment. The second edge 12m is positioned at an outer side of the first edge 12h in a radial direction.

The shift device of the fourth embodiment is not provided with a spring pressing the lever members 24 outwardly in the radial direction, which is different from that of the first embodiment. The centrifugal force, however, acts on the lever members 24 outwardly in the radial direction instead of the spring force in the first embodiment when the leverage operation is needed in the fourth embodiment.

The operation of the shift device of the fourth embodiment will be described.

FIG. 20 shows a synchronization-operational state where the sleeve 20 is moved toward the reverse position, namely the left side in FIG. 20. In this state, the fifth-speed gear is held, while the input shaft, the hub 12, the sleeve 20, the synchronization ring 22 and the lever members 24 are rotated together with a not-shown clutch disc.

In this shift operation toward the reverse position, the sleeve 20 is moved toward the left side in FIG. 20. The second slanted surface 20h of the groove 20g of the sleeve 20 contacts with the top portions 24c of the lever members 24, the contact points thereof functioning as the points W of effort. The lever members 24 contact with the second edge 12m of the hub 12, the contact points thereof functioning as fulcrums V, and the action surfaces 24f of the lever members 24 contact with the second slanted surface 22f of the synchronizer ring 22 to act not-shown axial-directional force F3 on the synchronizer ring 22 toward the fifth-speed gear side, the contact points thereof functioning as the points U of action.

Thus, the friction torque generated due to a speed difference between the synchronizer ring 22 and the fifth-speed gear, provides not-shown press force F2 acting on the lever members 24 outwardly in the radial direction at the contact points Z of the projections 22c and the torque receiving portions 24a.

Therefore, the force F2 can be obtained by the following equation.

$$F2=F1·L2'/L11'+F3·L3''/L1'$$

where L1' is a length in the radial direction between the fulcrum V and the point U of action, L2' is a length in the radial direction between the fulcrum V and the point W of effort, and L3'' is a length in the axial direction between the fifth-speed-gear side surface of the hub 12 and the contact point Z of the projection 22c of the synchronizer ring 22 and the edge 14j of the lever member 24.

Figure 22:
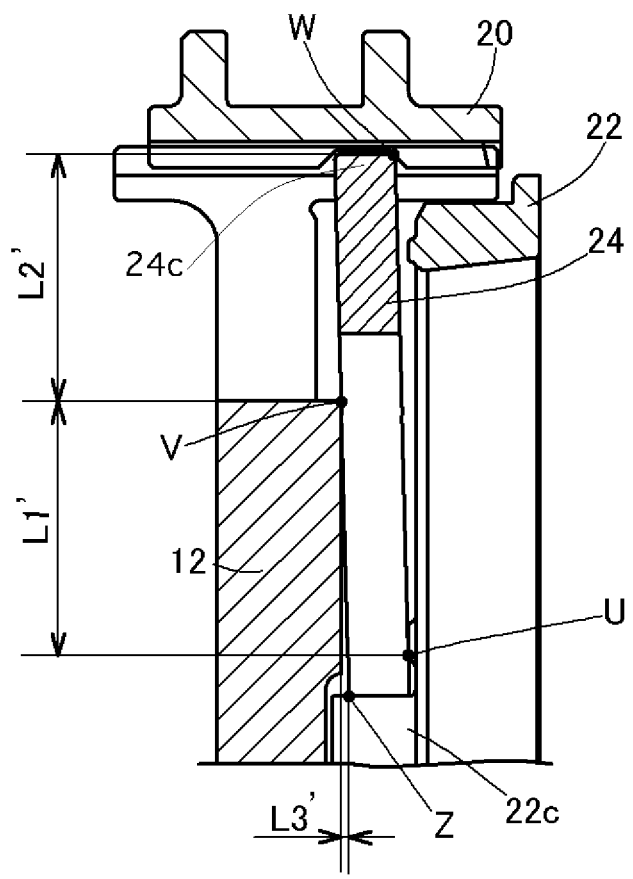
FIG. 22 is a cross sectional side view of another conventional shift device.

The length L3'' in the fourth embodiment becomes longer than the length L3 shown in FIG. 22 because the torque receiving portions 24a of the lever members 24 are formed to have the angle γ. This increases the force F2, which means that it increases a lever ratio of the leverage operation using the lever members 24. Accordingly, in the shift operation toward the reverse position, small operation force of a driver enables it to increase its synchronization torque and decrease the rotational speed of the clutch disc connected with the input shaft, the hub 12 and the sleeve 20. The disc clutch can be stopped or largely decreased in speed, so that no or little gear noise is generated in a gear-meshing operation toward the reverse position.

When the angle γ is set so that the contact points Z become to be positioned at the midst of the axial thickness of the lever member 24. In this case, it can avoid the lever members 24 from wrong assembly. The angle γ may be set the contact points Z so that the compact points Z are positioned to become nearer to the fifth-speed gear. This enables the lever ratio using the lever members 24 to increase.

Incidentally, the contact points of the torque receiving portions 24a and the projections 22c are formed by one of slanted surfaces, curved surfaces and cut-off portions that are provided on at least one of the torque receiving portions 24a and the projections 22c.

In order to obtain the fifth speed position, the sleeve 20 is moved toward the right side in FIG. 20. The synchronization operation in this case becomes similar to that in the first embodiment. Accordingly, its explanation is omitted.

While there have been particularly shown and described with reference to preferred embodiments thereof, it will be understood that various modifications may be made therein.

For example, the shift devices of the embodiments can be provided on an input shaft, an intermediate shaft and the likes. The number of the lever members 24 and the springs 26 may be set appropriately.

The friction surface and/or the cone surface may be formed with an oil groove thereon, and they may be attached with carbon material.

The configuration of the torque receiving portions 24a may be set appropriately as far as contact positions Z of the torque receiving portions 24a and the projections 22c in a synchronization operation are set at a hub side of the lever members 24 and within an axial-directional distance being less than a thickness of the lever member 24 between the points of support X and the contact positions Z.

What is claimed is:

1. A shift device with a synchronizer comprising:
   a shaft (10) that is capable of transmitting a power;
   a hub (12) that is fixed on the shaft (10);
   a sleeve (20) that is provided with splines (20a) and slanted surfaces (20d), the sleeve (20) being supported on the hub (12) slidably in an axial direction;
   a speed gear (8; 16; 18) that is provided with a cone surface (8b) and splines (8a) that are capable of engaging with the splines (20a) of the sleeve (20);
   a synchronizer ring (22) that is formed with a plurality of projections (22c) extending in an axial direction toward the hub (12) and also with a plurality of pressure receiving surfaces (22b); and
   a plurality of lever members (24) that have a top portion (24c), arm portions (24g) extending in a direction departing from the top portion (24c), and an action surface (24f), the top portions (24c) being contactable with the slanted surfaces (20d) of the sleeve (20) to function as points (W) of effort in a leverage operation, the arm portions (24g) of the lever members (24) being contactable with the hub (12) to function as points (X) of support in the leverage operation, the action surfaces (24f) being located at speed-gear sides of the lever members (24) and between the points (W) of effort and the points (X) of support to be contactable with the synchronizer ring (22) to function as points (Y) of action in the leverage operation, and the lever members (24) being provided with a plurality of torque receiving portions (24a) capable of receiving torque from the projections (22c) of the synchronizer ring (22), wherein
   the lever members (24) and the synchronizer ring (22) have contact positions (Z) where the torque receiving portions (24a) and the projections (22c) are capable of contacting each other in a synchronization operation when the sleeve (20) is moved toward the speed gear (8; 16; 18), and wherein
   the contact positions (Z) are set at a hub side of the lever members (24) and an axial-directional distance between the points (X) of support and the contact positions (Z) is less than a thickness of the lever member (24).

2. The shift device according to claim 1, wherein contact points of the torque receiving portions (24a) and the projections (22c) are formed by one of slanted surfaces, curved surfaces and cut-off portions that are provided on at least one of the torque receiving portions (24a) and the projections (22c).

3. The shift device according to claim 2, wherein
   the torque receiving portions (24a) are formed between the top portions (24c) and the arm portions (24g) of the lever members (24), and wherein
   the points (X) of support are positioned at contact points of edges (12h) of support surfaces (12k) of the hub (12) and an edge (24j) formed by a step on a hub-side surface of the torque receiving portions (24a) of the lever members (24).

4. The shift device according to claim 3, further comprising:
   a plate member clipped between the projections (22c) and the top portions (24c).

5. The shift device according to claim 4, wherein
   the plate member comprises a press portion of a spring (26) that pushes the lever members (24) outwardly in a radial direction.

6. The shift device according to claim 2, further comprising:
   a plate member clipped between the projections (22c) and the top portions (24c).

7. The shift device according to claim 6, wherein
   the plate member comprises a press portion of a spring (26) that pushes the lever members (24) outwardly in a radial direction.

8. The shift device according to claim 1, wherein
   the torque receiving portions (24a) are formed between the top portions (24c) and the arm portions (24g) of the lever members (24), and wherein
   the points (X) of support are positioned at contact points of edges (12h) of support surfaces (12k) of the hub (12) and an edge (24j) formed by a step on a hub-side surface of the torque receiving portions (24a) of the lever members (24).

9. The shift device according to claim 8, further comprising:
   a plate member clipped between the projections (22c) and the top portions (24c).

10. The shift device according to claim 9, wherein
    the plate member comprises a press portion of a spring (26) that pushes the lever members (24) outwardly in a radial direction.

11. The shift device according to claim 1, further comprising:
    a plate member clipped between the projections (22c) and the top portions (24c).

12. The shift device according to claim 11, wherein
    the plate member comprises a press portion of a spring (26) that pushes the lever members (24) outwardly in a radial direction.

13. The shift device according to claim 12, wherein
    a hub side end portion of the plate member is bent to form an end surface to transmit torque from the projections (22c) to the torque receiving portions (24a).

14. A shift device with a synchronizer comprising:
    a shaft (10) that is capable of transmitting a power;
    a hub (12) that is fixed on the shaft (10);
    a sleeve (20) that is provided with splines (20a) and slanted surfaces (20d), the sleeve (20) being supported on the hub (12) slidably in an axial direction;
    a speed gear that is provided with a cone surface (8b) and splines (8a) that are capable of engaging with the splines (20a) of the sleeve (20);
    a synchronizer ring (22) that is formed with a plurality of projections (22c) extending in an axial direction toward the hub (12) and also with a plurality of pressure receiving surfaces (22b); and
    a plurality of lever members (24) that have a top portion (24c), arm portions (24g) extending in a direction departing from the top portion (24c), and an action surface (24f), the top portions (24c) being contactable with the slanted surfaces (20d) of the sleeve (20) to function as points (W) of effort in a leverage operation, the arm portions (24g) of the lever members (24) being contactable with the hub (12) to function as points (V) of support in the leverage operation, the action surfaces (24f) being located at speed-gear sides of the lever members (24) and between the points (W) of effort and the points (V) of support to be contactable with the synchronizer ring (22) to function as points (U) of action in the leverage operation, and the lever members (24) being provided with a plurality of torque receiving portions (24a) capable of receiving torque from the projections (22c) of the synchronizer ring (22), wherein the lever members (24) and the synchronizer ring (22) have contact positions (Z) where the torque receiving portions (24a) and the projections (22c) are capable of contacting each other in a synchronization operation when the sleeve (20) is moved away from the speed gear (8; 16; 18) toward a reverse position, and wherein the contact positions (Z) are set at a midst of an axial thickness of the lever members (24) and the points (V) of support are set at an outer side in the radial direction with respect to a position of the points (U) of action when the sleeve (20) is moved toward the reverse position.

15. The shift device according to claim 14, wherein contact points of the torque receiving portions (24a) and the projections (22c) are formed by one of slanted surfaces, curved surfaces and cut-off portions that are provided on at least one of the torque receiving portions (24a) and the projections (22c).

16. The shift device according to claim 15, further comprising:
    a plate member clipped between the projections (22c) and the top portions (24c).

17. The shift device according to claim 16, wherein
    the plate member comprises a press portion of a spring (26) that pushes the lever members (24) outwardly in a radial direction.

18. The shift device according to claim 14, further comprising:
    a plate member clipped between the projections (22c) and the top portions (24c).

19. The shift device according to claim 18, wherein
    the plate member comprises a press portion of a spring (26) that pushes the lever members (24) outwardly in a radial direction.

20. The shift device according to claim 19, wherein
    a hub side end portion of the plate member is bent to form an end surface to transmit torque from the projections (22c) to the torque receiving portions (24a).

* * * * *